US007870973B2

(12) United States Patent
Michelli et al.

(10) Patent No.: US 7,870,973 B2
(45) Date of Patent: Jan. 18, 2011

(54) METHODS AND APPARATUS FOR DISPENSING SOLID ARTICLES

(75) Inventors: Richard D. Michelli, Raleigh, NC (US); Andrew Kirk Dummer, Chapel Hill, NC (US); Bryan Patrick Farnsworth, Wake Forest, NC (US); Christopher Todd Hilliard, Bath, NC (US)

(73) Assignee: PARATA Systems, LLC, Durham, NC (US)

( * ) Notice: Subject to any disclaimer, the term of this patent is extended or adjusted under 35 U.S.C. 154(b) by 218 days.

(21) Appl. No.: 12/104,706

(22) Filed: Apr. 17, 2008

(65) Prior Publication Data

US 2009/0173748 A1 Jul. 9, 2009

Related U.S. Application Data

(60) Provisional application No. 61/019,971, filed on Jan. 9, 2008.

(51) Int. Cl.
*B65H 3/08* (2006.01)
*B65G 59/00* (2006.01)

(52) U.S. Cl. ....................................... 221/156; 221/311

(58) Field of Classification Search ................. 221/156, 221/200, 202, 208, 241, 258, 278, 281, 311
See application file for complete search history.

(56) References Cited

U.S. PATENT DOCUMENTS 2,578,369 A * 12/1951 Noelcke, Sr. ............... 119/53.5

(Continued)

FOREIGN PATENT DOCUMENTS

CA 936 501 11/1973

(Continued)

OTHER PUBLICATIONS

International Search Report and Written Opinion (14 pages) corresponding to International Application No. PCT/US2008/014109; Mailing Date: Mar. 31, 2009.

*Primary Examiner*—Gene Crawford
*Assistant Examiner*—Kelvin L Randall, Jr.
(74) *Attorney, Agent, or Firm*—Myers Bigel Sibley & Sajovec, PA

(57) ABSTRACT

An apparatus for dispensing solid articles includes a dispensing channel, a housing and an article supply regulation system. The dispensing channel has an inlet and an outlet and defines a dispensing path therebetween. The housing defines a hopper chamber to hold the articles. The hopper chamber is in fluid communication with the inlet of the dispensing channel. The housing includes a floor. The article supply regulation system includes a first divider wall, a second divider wall and a third divider wall configured and positioned in the hopper chamber to define, in combination with the housing: a front region between the inlet and the first divider wall; a first rear region between the first divider wall and the second divider wall; a second rear region between the second divider wall and the third divider wall; and a third rear region on a side of the third divider wall opposite the second rear region. The first divider wall forms a front choke passage between the front region and the first rear region and between the first divider wall and the floor. The second divider wall forms a first rear choke passage between the first rear region and the second rear region and between the second divider wall and the floor. The third divider wall forms a second rear choke passage between the second rear region and the third rear region and between the third divider wall and the floor and/or a side wall of the housing.

17 Claims, 9 Drawing Sheets

U.S. PATENT DOCUMENTS 2,665,775 A 1/1954 Smith
2,708,996 A 5/1955 Skillman
2,865,532 A 12/1958 Smith
3,023,851 A 3/1962 Stiller
3,144,958 A 8/1964 Gumpertz
3,160,793 A 12/1964 Colburn
3,175,669 A * 3/1965 Garvin ....................... 194/343
3,179,288 A 4/1965 Davy
3,185,851 A 5/1965 D'Emilio
3,196,276 A 7/1965 Naab
3,206,062 A 9/1965 Rappaport
3,310,199 A 3/1967 Roberts
3,312,372 A 4/1967 Cooper, Jr.
3,410,450 A 11/1968 Fortenberry
3,417,542 A 12/1968 Merrill
3,436,736 A 4/1969 Platt
3,556,342 A 1/1971 Guarr
3,599,152 A 8/1971 Williams
3,653,176 A 4/1972 Gess
3,730,388 A 5/1973 Bender
3,732,544 A 5/1973 Obland
3,780,907 A 12/1973 Colburn
3,815,780 A 6/1974 Bauer
3,837,139 A 9/1974 Roseberg
3,885,702 A 5/1975 Joslin
3,917,045 A 11/1975 Williams
4,267,942 A 5/1981 Wick
4,434,602 A 3/1984 Culpepper
4,457,451 A * 7/1984 Ichikawa .................... 221/190
4,546,901 A 10/1985 Buttarazzi
4,573,606 A 3/1986 Lewis
4,655,026 A 4/1987 Wigoda
4,664,289 A 5/1987 Shimizu
4,674,259 A 6/1987 Hills
4,674,651 A 6/1987 Scidmore
4,693,057 A 9/1987 Rittinger
4,695,954 A 9/1987 Rose
4,741,428 A * 5/1988 Taniguchi et al. ...... 198/397.04
4,766,542 A 8/1988 Pilarczyk
4,767,023 A 8/1988 Hackmann
4,801,044 A 1/1989 Kubota et al.
4,805,377 A 2/1989 Carter
4,869,392 A 9/1989 Moulding, Jr. et al.
4,918,604 A 4/1990 Baum
4,971,513 A 11/1990 Bergerioux
4,980,292 A 12/1990 Elbert
4,984,709 A 1/1991 Weinstein
5,018,644 A 5/1991 Hackmann
5,047,948 A 9/1991 Turner
5,337,919 A 8/1994 Spaulding et al.
5,570,812 A * 11/1996 Ando et al. ................. 221/233
5,671,262 A 9/1997 Boyer et al.
6,006,946 A 12/1999 Williams et al.
6,036,812 A 3/2000 Williams et al.
6,116,821 A * 9/2000 Teoh et al. .................. 406/137
6,161,721 A 12/2000 Kudera et al.
6,176,392 B1 1/2001 Williams et al.
RE37,829 E 9/2002 Charhut
6,443,326 B1 * 9/2002 Saito et al. .................. 221/163
6,631,826 B2 10/2003 Pollard et al.
6,736,286 B2 5/2004 Hashimoto et al.
6,971,541 B2 12/2005 Williams et al.
2003/0015555 A1 * 1/2003 Pollard et al. ............... 222/278
2004/0004085 A1 * 1/2004 Williams et al. ............ 221/278
2004/0026442 A1 2/2004 Hutchinson
2004/0159669 A1 * 8/2004 Pollard et al. ............... 221/278
2006/0241807 A1 * 10/2006 Daniels et al. .............. 700/235
2006/0280564 A1 * 12/2006 Hoogers ..................... 406/197

FOREIGN PATENT DOCUMENTS

EP 0 118 856 A1 9/1984
GB 1 168 758 10/1969
GB 1 411 951 10/1975
GB 2 244 481 A 12/1991
JP 51-000792 B 1/1976
JP 52-047400 4/1977
JP 61-104904 5/1986
JP 63-208410 8/1988
JP 64-028102 1/1989
JP 1-288265 11/1989
JP 2-028417 1/1990

* cited by examiner

METHODS AND APPARATUS FOR DISPENSING SOLID ARTICLES

RELATED APPLICATION(S)

The present application claims the benefit of U.S. Provisional Patent Application Ser. No. 61/019,971, filed Jan. 9, 2008, the disclosure of which is hereby incorporated herein by reference in its entirety.

FIELD OF THE INVENTION

The present invention is directed generally to the dispensing of solid articles and, more specifically, is directed to the automated dispensing of solid articles such as solid pharmaceutical articles.

BACKGROUND OF THE INVENTION

Pharmacy generally began with the compounding of medicines, which entailed the actual mixing and preparing of medications. Heretofore, pharmacy has been, to a great extent, a profession of dispensing, that is, the pouring, counting, and labeling of a prescription, and subsequently transferring the dispensed medication to the patient. Because of the repetitiveness of many of the pharmacist's tasks, automation of these tasks has been desirable.

Some attempts have been made to automate the pharmacy environment. For example, U.S. Pat. No. 6,971,541 to Williams et al. describes an automated system for dispensing pharmaceuticals using dispensing bins. Each dispensing bin includes a hopper in which tablets are stored and a dispensing channel fluidly connecting the hopper to a dispensing outlet. Forward and reverse air flows are used to selectively convey the tablets through the dispensing channel in each of a dispensing direction (toward the outlet) and a reverse direction (toward the hopper).

SUMMARY OF THE INVENTION

According to embodiments of the present invention, an apparatus for dispensing solid articles includes a dispensing channel, a housing and an article supply regulation system. The dispensing channel has an inlet and an outlet and defines a dispensing path therebetween. The housing defines a hopper chamber to hold the articles. The hopper chamber is in fluid communication with the inlet of the dispensing channel. The housing includes a floor. The article supply regulation system includes a first divider wall, a second divider wall and a third divider wall configured and positioned in the hopper chamber to define, in combination with the housing: a front region between the inlet and the first divider wall; a first rear region between the first divider wall and the second divider wall; a second rear region between the second divider wall and the third divider wall; and a third rear region on a side of the third divider wall opposite the second rear region. The first divider wall forms a front choke passage between the front region and the first rear region and between the first divider wall and the floor. The second divider wall forms a first rear choke passage between the first rear region and the second rear region and between the second divider wall and the floor. The third divider wall forms a second rear choke passage between the second rear region and the third rear region and between the third divider wall and the floor and/or a side wall of the housing.

According to method embodiments of the present invention, a method for dispensing solid articles includes providing an apparatus including a dispensing channel, a housing, and an article supply regulation system. The dispensing channel has an inlet and an outlet and defines a dispensing path therebetween. The housing defines a hopper chamber to hold the articles. The hopper chamber is in fluid communication with the inlet of the dispensing channel. The housing includes a floor. The article supply regulation system includes a first divider wall, a second divider wall and a third divider wall configured and positioned in the hopper chamber to define, in combination with the housing: a front region between the inlet and the first divider wall; a first rear region between the first divider wall and the second divider wall; a second rear region between the second divider wall and the third divider wall; and a third rear region on a side of the third divider wall opposite the second rear region. The first divider wall forms a front choke passage between the front region and the first rear region and between the first divider wall and the floor. The second divider wall forms a first rear choke passage between the first rear region and the second rear region and between the second divider wall and the floor. The third divider wall forms a second rear choke passage between the second rear region and the third rear region and between the third divider wall and the floor and/or a side wall of the housing. The method further includes: placing the articles in the apparatus such that the articles are disposed in each of the front region, the first rear region, the second rear region and the third rear region and a load of the articles in the third rear region is supported by the third divider wall; and dispensing the articles from the hopper chamber through the dispensing channel. According to some embodiments, the articles are pharmaceutical articles.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
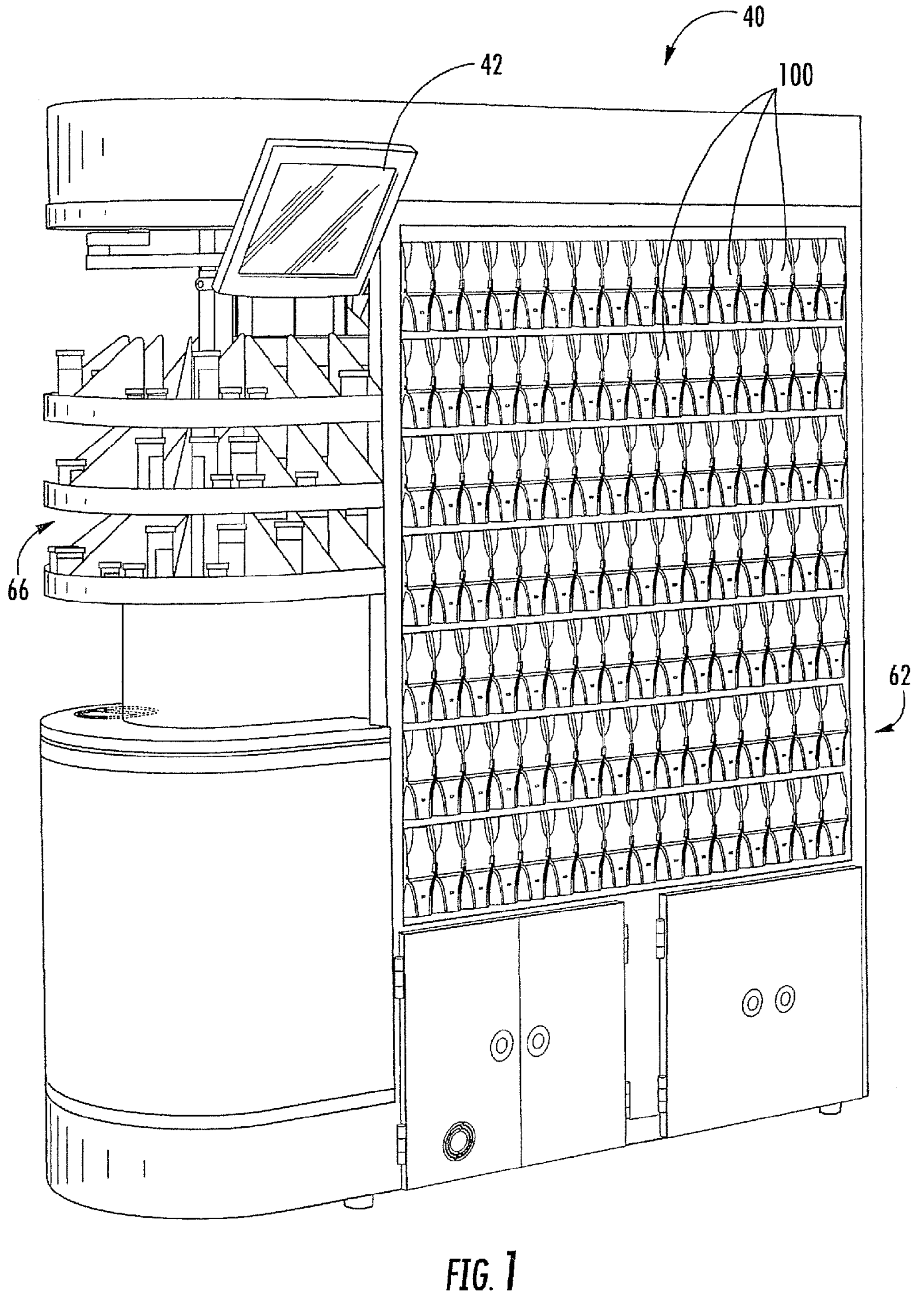
FIG. 1 is a perspective view of a pharmaceutical tablet dispensing system including an article supply regulation system according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "transverse" means across and nonparallel to a related axis, direction or the like. For example, an axis that is referred to as transverse to another axis extends across and at an angle with respect to the other axis. Transverse can include perpendicular, but is not limited thereto.

In accordance with embodiments of the present invention, apparatus and methods are provided for dispensing solid articles. In particular, such methods and apparatus may be used to dispense solid pharmaceuticals. According to some embodiments, the articles are pharmaceutical tablets or pills.

According to some embodiments of the present invention, a solid article dispensing apparatus (e.g., a pharmaceutical tablet dispensing bin) is provided including an article supply regulation system to control the loading and supply of articles (e.g., pharmaceutical tablets) to a dispensing channel. The article supply regulation system may regulate the supply of articles to an active article dispensing mechanism such as a forced air flow dispensing mechanism. According to some embodiments, the article supply regulation system operates passively and the cooperating article dispensing mechanism operates actively.

Figure 2:
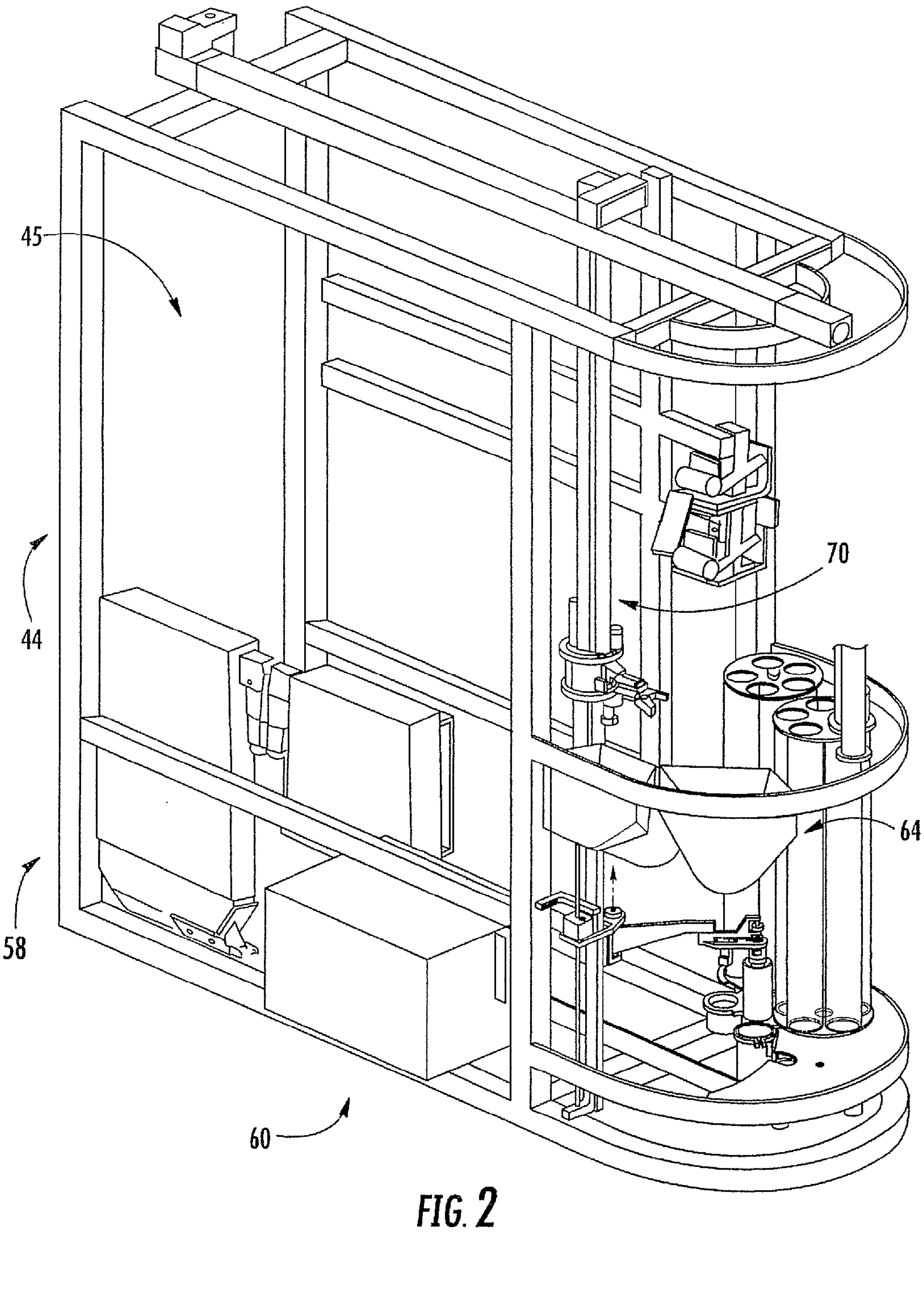
FIG. 2 is a cutaway view of the tablet dispensing system of FIG. 1 illustrating a container dispensing station, a labeling carrier, a dispensing carrier, and a closure dispensing station thereof.

A dispensing system according to embodiments of the present invention and that can carry out the foregoing methods is illustrated in FIGS. 1-9 and designated broadly therein at 40 (FIGS. 1 and 2). The system 40 includes a support frame 44 for the mounting of its various components. Those skilled in this art will recognize that the frame 44 illustrated herein is exemplary and can take many configurations that would be suitable for use with the present invention. The frame 44 provides a strong, rigid foundation to which other components can be attached at desired locations, and other frame forms able to serve this purpose may also be acceptable for use with this invention.

The system 40 generally includes as operative stations a controller (represented herein by a graphics user interface 42), a container dispensing station 58, a labeling station 60, a tablet dispensing station 62, a closure dispensing station 64, and an offloading station 66. In the illustrated embodiment, containers, tablets and closures are moved between these stations with a dispensing carrier 70; however, in some embodiments, multiple carriers are employed. The dispensing carrier 70 has the capability of moving the container to designated locations within the cavity 45 of the frame 44. Except as discussed herein with regard to the dispensing station 62, each of the operative stations and the conveying devices may be of any suitable construction such as those described in detail in U.S. Pat. No. 6,971,541 to Williams et al. and/or U.S. Patent Publication No. US-2006-0241807-A1, the disclosures of which are hereby incorporated herein in their entireties.

The controller 42 controls the operation of the remainder of the system 40. In some embodiments, the controller 42 will be operatively connected with an external device, such as a personal or mainframe computer, that provides input information regarding prescriptions. In other embodiments, the controller 42 may include a stand-alone computer that directly receives manual input from a pharmacist or other operator. An exemplary controller may include a conventional microprocessor-based personal computer. The controller 42 may be a centralized computer or portions thereof may be physically and/or functionally distributed or divided into multiple controllers. For example, according to some embodiments, the controller is embodied in part in each tablet dispensing bin assembly.

In operation, the controller 42 signals the container dispensing station 58 that a container of a specified size is desired. In response, the container dispensing station 58 delivers a container for retrieval by the carrier 70. From the container dispensing station 58, the container is moved to the labeling station 60 by the carrier 70. The labeling station 60 includes a printer that is controlled by the controller 42. The printer prints and presents an adhesive label that is affixed to the container.

Filling of labeled containers with tablets is carried out by the tablet dispensing station 62. The tablet dispensing station

62 comprises a plurality of tablet dispensing bin assemblies or bins 100 (described in more detail below), each of which holds a bulk supply of individual tablets (typically the bins 100 will hold different tablets). Referring to FIGS. 3-9, the dispensing bins 100, which may be substantially identical in size and configuration, are organized in an array mounted on the rails of the frame 44. Each dispensing bin 100 has a dispensing channel 120 with an outlet 124 (FIG. 6) that faces generally in the same direction, to create an access region for the dispensing carrier 70. The identity of the tablets in each bin is known by the controller 42, which can direct the dispensing carrier 70 to transport the container to the proper bin 100.

The dispensing bins 100 are configured to singulate, count, and dispense the tablets contained therein, with the operation of the bins 100 and the counting of the tablets being controlled by the controller 42. According to some embodiments, each bin 100 includes its own dedicated controller that is operative to execute a dispensing run upon receiving a command from a central controller or the like. Some embodiments may employ the controller 42 as the device which monitors the locations and contents of the bins 100; others may employ the controller 42 to monitor the locations of the bins, with the bins 100 including indicia (such as a bar code or electronic transmitter) to identify the contents to the controller 42. In still other embodiments, the bins 100 may generate and provide location and content information to a central controller.

Any of a number of dispensing units that singulate and count discrete objects may be employed if suitably modified to include the inventive aspects disclosed herein. In particular, dispensing units that rely upon targeted air flow and a singulating nozzle assembly may be used, such as the devices described in U.S. Pat. No. 6,631,826 to Pollard et al. and/or U.S. Patent Publication No. US-2006-0241807-A1, each of which is hereby incorporated herein by reference in its entirety. Bins of this variety may also include additional features, such as those described below.

After the container is desirably filled by the tablet dispensing station 62, the dispensing carrier 70 moves the filled container to the closure dispensing station 64. The closure dispensing station 64 may house a bulk supply of closures and dispense and secure them onto a filled container. The dispensing carrier 70 then moves to the closed container, grasps it, and moves it to the offloading station 66.

Figure 6:
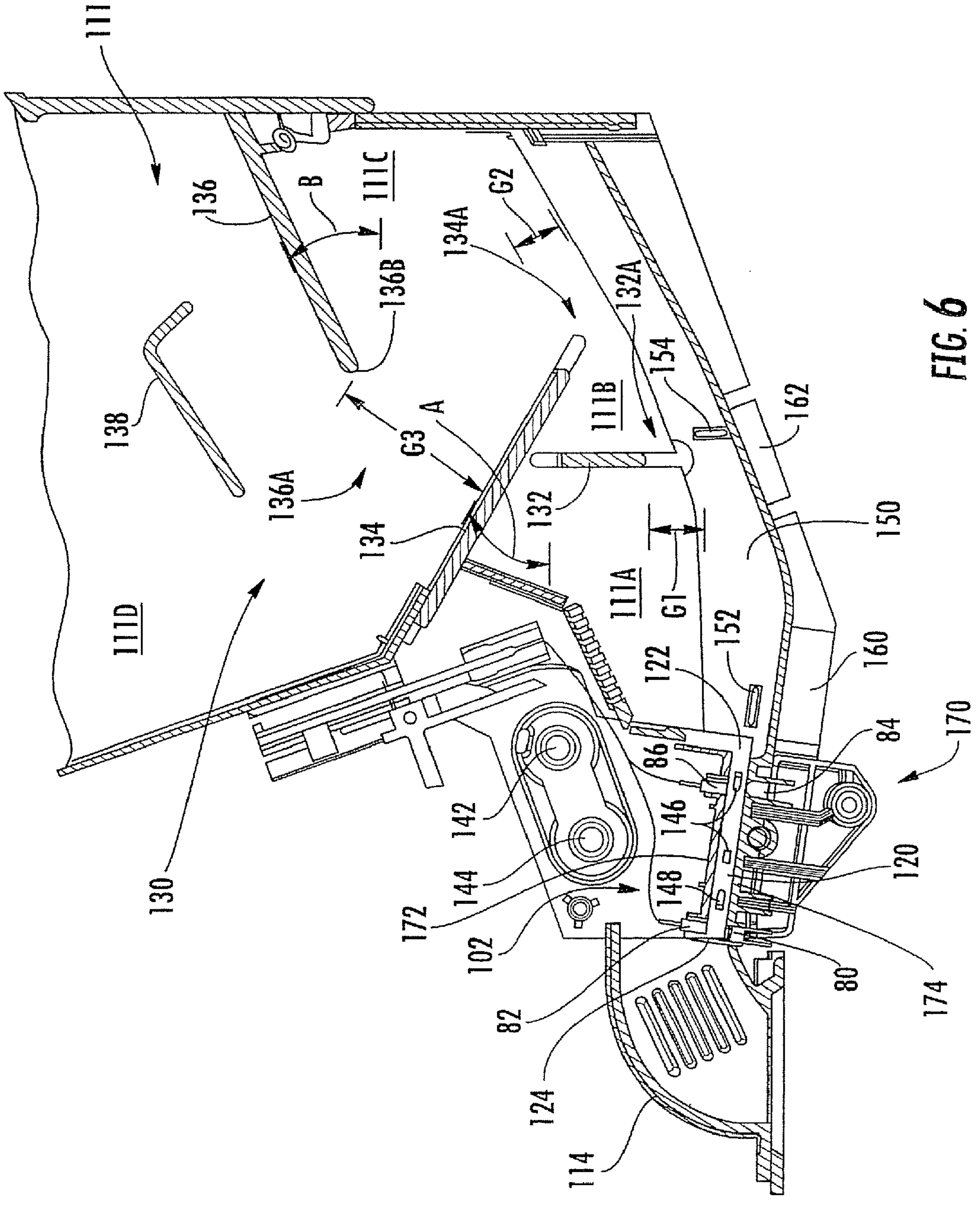
FIG. 6 is a fragmentary, side cross-sectional view of the bin of FIG. 3 taken along the line 5-5 of FIG. 4.
Figure 7:
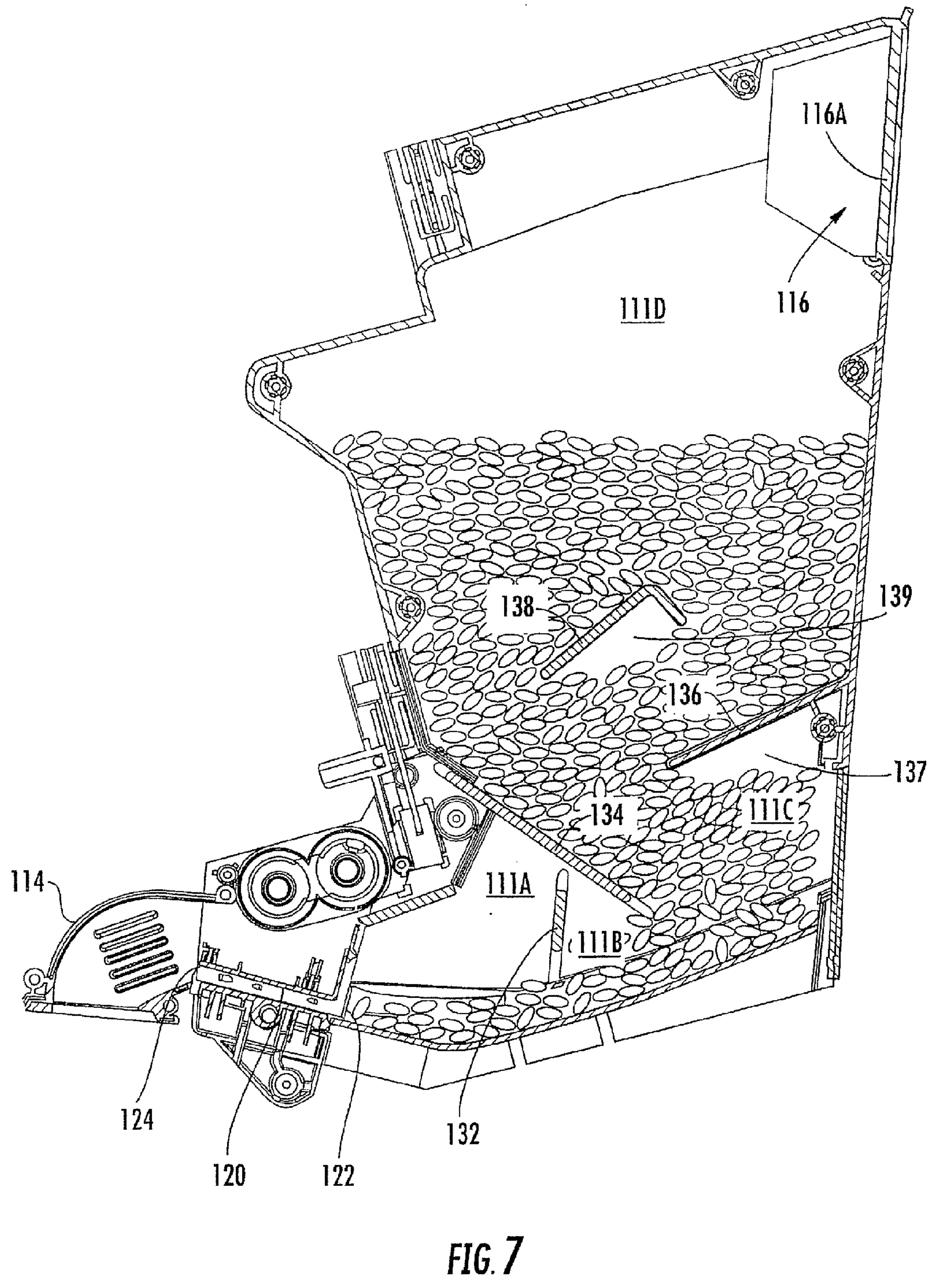
FIG. 7 is a side cross-sectional view of the bin of FIG. 3 taken along the line 5-5 of FIG. 4 and wherein the bin is filled with tablets to be dispensed.
Figure 8:
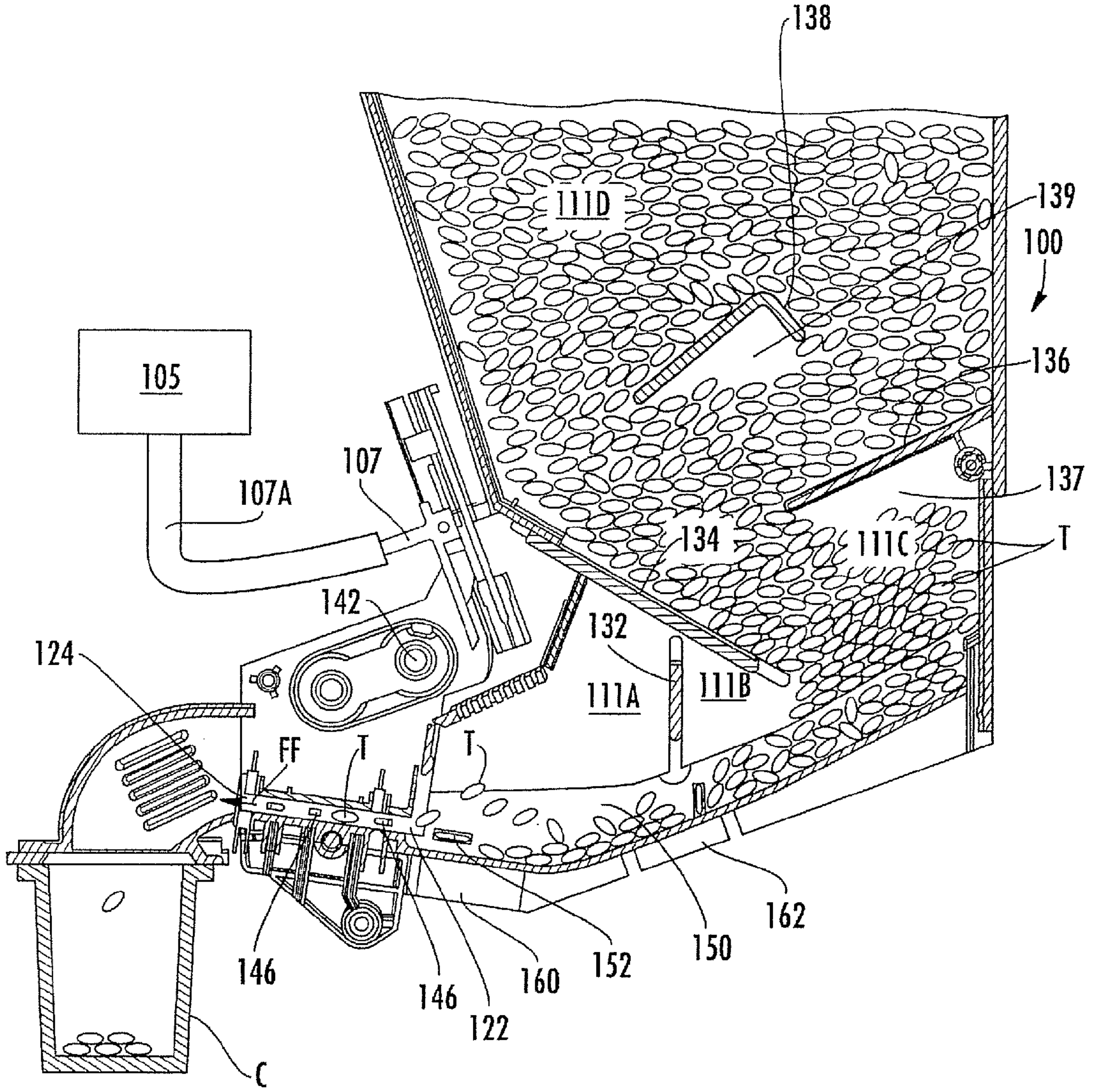
FIG. 8 is a fragmentary, cross-sectional view of the bin of FIG. 3 wherein tablets contained therein are being agitated and dispensed in a forward or dispensing direction.

Turning to the bins 100 in more detail, an exemplary bin 100 is shown in more detail in FIGS. 3-9. The bin 100 includes a housing 110 having a hopper portion 112 and a nozzle 114. The bin 100 is fluidly connected with a pressurized gas source 105 (FIG. 8). The bin 100 further includes an article supply regulation system 130 (FIG. 5) as discussed in more detail herein.

Figure 5:
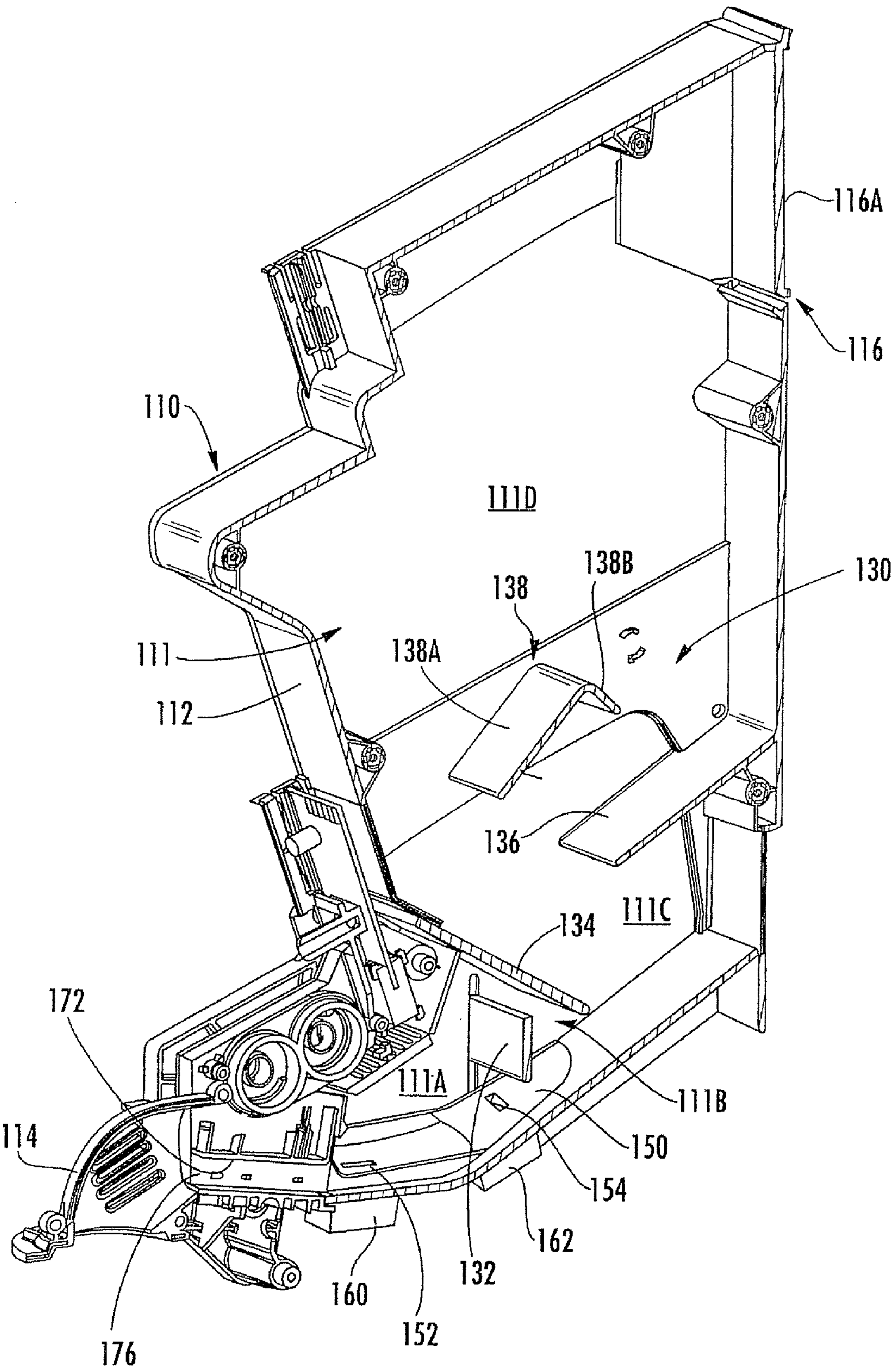
FIG. 5 is a front, right, cross-sectional perspective view of the dispensing bin of FIG. 3 taken along the line 5-5 of FIG. 4.

Referring to FIGS. 5-7, the hopper portion 112 defines a hopper chamber 111 that can be filled with tablets T (FIG. 7). The tablets T may be pills in any suitable form, including capsules and the like. The bin 100 can be filled or replenished with tablets through an opening 116 located at the upper rear portion of the bin 100. The opening 116 is selectively accessible via a pivoting door 116A, for example. According to some embodiments, the hopper chamber 111 has a volume or tablet capacity of at least 1500 cc.

With reference to FIGS. 6 and 8, the tablets T can be dispensed one at a time into the container C through the dispensing channel 120. The dispensing channel 120 has an inlet 122 adjacent and fluidly connecting the channel 120 to the hopper chamber 111. The dispensing channel 120 includes the outlet 124 downstream from and opposite the inlet 122 and through which tablets may exit to be dispensed into the container C. The bin 100 defines a tablet dispensing path from the inlet 122, through the dispensing channel 120, through the outlet 124, and through the nozzle 114.

The hopper portion 112 has a bottom wall defining a floor 150. The floor 150 has a sloped rear portion that slopes downwardly toward the inlet 122. The floor 150 also has a funnel-shaped front portion. A front agitation port or outlet 152 and a rear agitation port or outlet 154 are provided in the floor 150. As discussed below, air or other pressurized gas can be flowed through the outlets 152, 154 and into the hopper chamber 111 to agitate the tablets T contained therein.

With reference to FIGS. 5-7, the article supply regulation system 130 includes a front or first partition or divider wall 132, a second partition or divider wall 134, a third partition or divider wall 136, and a fourth partition or divider wall 138. Typically, the walls 132, 134, 136, 138 will extend across the full width of the chamber 111.

Figure 3:
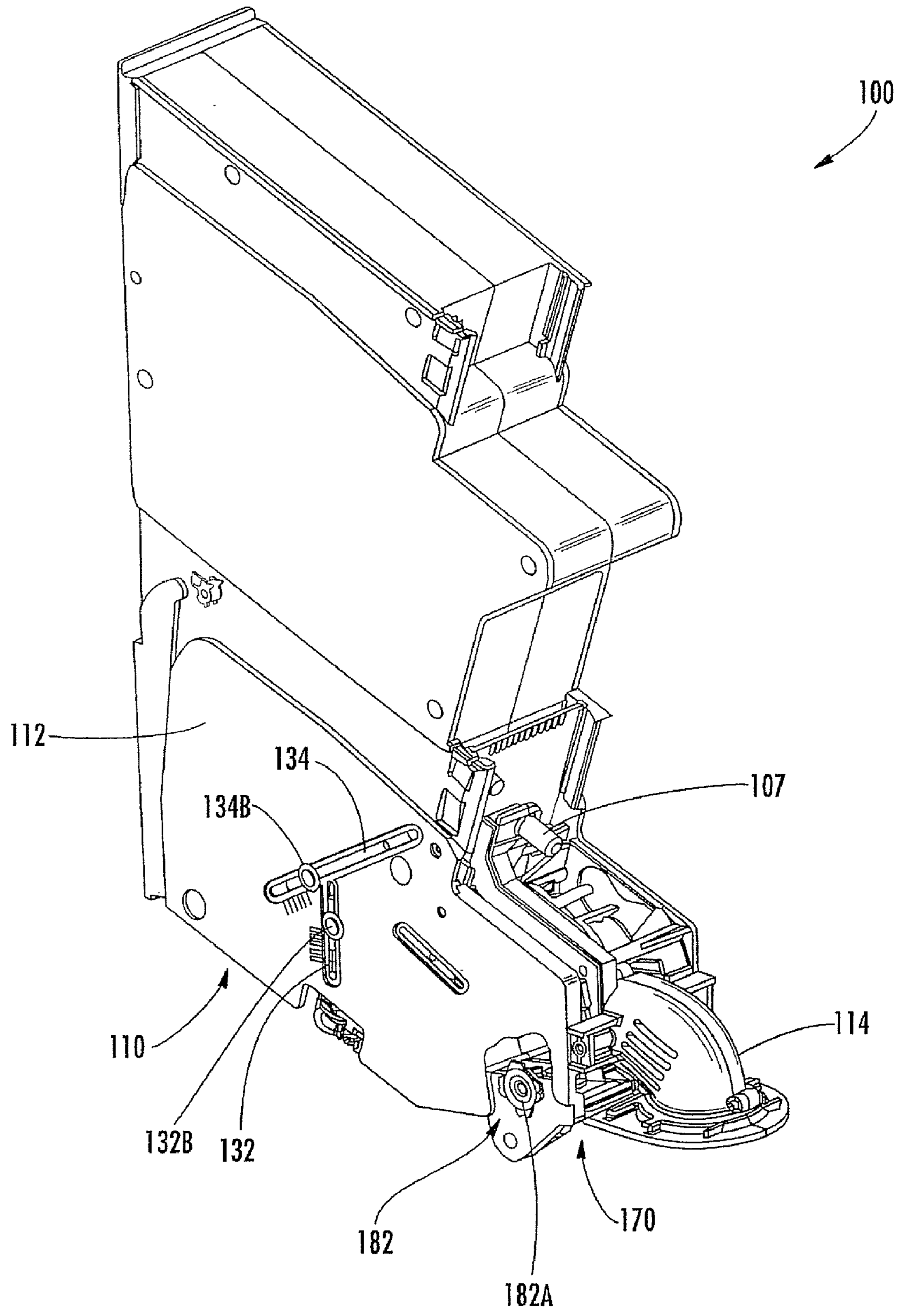
FIG. 3 is a front, left perspective view of a dispensing bin according to some embodiments of the present invention forming a part of the tablet dispensing system of FIG. 1.
Figure 4:
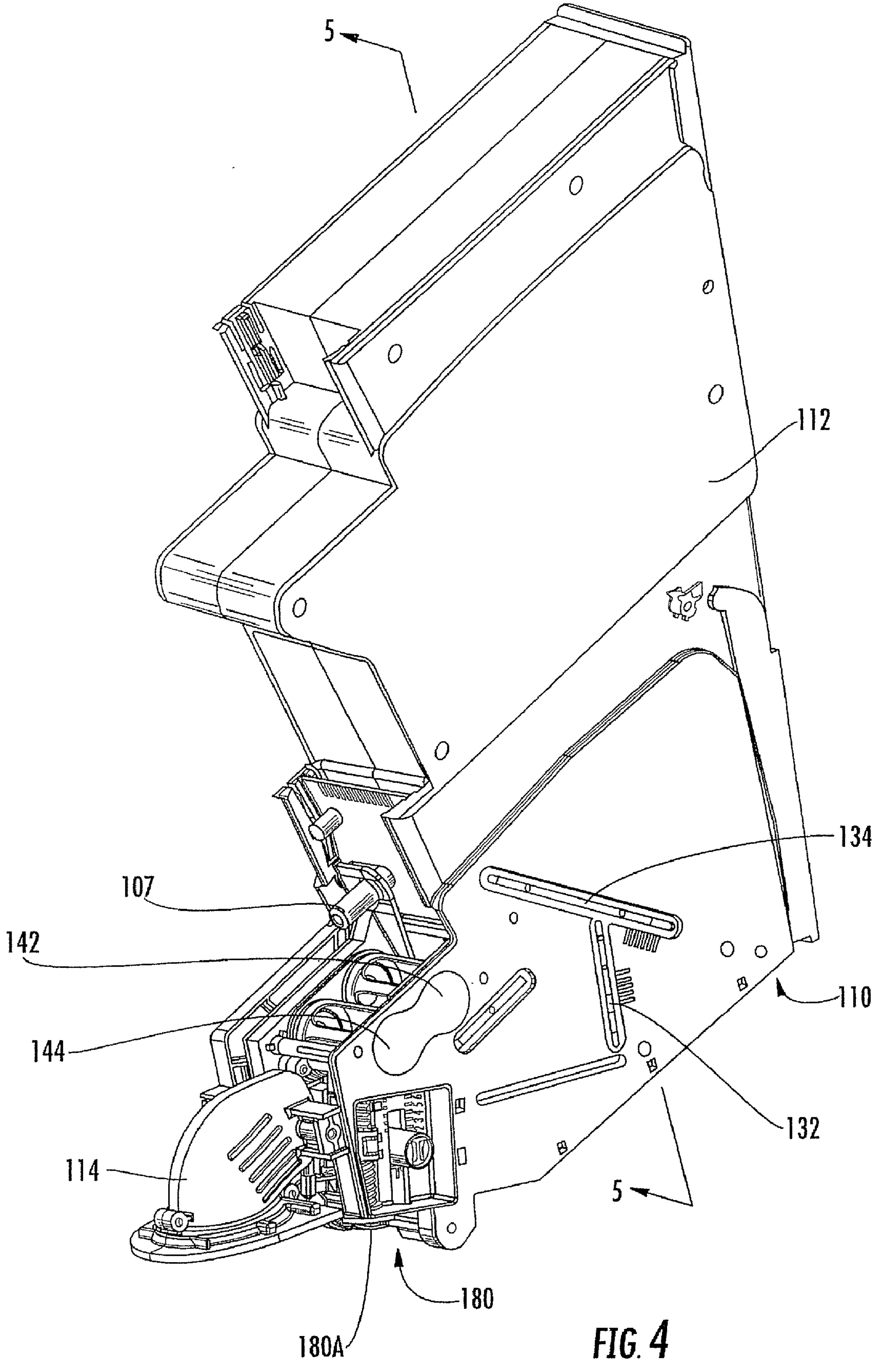
FIG. 4 is a front, right perspective view of the dispensing bin of FIG. 3.

With reference to FIG. 6, the first divider wall 132 extends through the hopper chamber 111 and forms a gap or choke point 132A between the lower edge of the wall 132 and the floor 150. According to some embodiments, the choke point 132A has a gap spacing or height G1 of between about 0.25 and 0.75 inch. The position of the wall 132, and thereby the gap spacing G1, may be selectively adjusted using an adjustment mechanism 132B (FIG. 3).

The second divider wall 134 extends through the hopper chamber 111 and forms a gap or choke point 134A between the lower edge of the wall 134 and the floor 150. According to some embodiments, the choke point 134A has a gap spacing or height G2 of between about 0.6 and 1 inch. The position of the wall 134, and thereby the gap spacing G2, may be selectively adjusted using an adjustment mechanism 134B (FIG. 3). According to some embodiments, the second divider wall 134 forms an angle A (FIG. 6) of at least about 30 degrees with respect to horizontal.

The third divider wall 136 extends through the hopper chamber 111 and forms a gap or choke point 136A at the narrowest point between the leftmost edge 136B of the third divider wall 136 and the second divider wall 134. The choke point 136A has a gap spacing or width G3. According to some embodiments, the gap spacing G3 is at least as great as the longest dimension of the tablets intended to be dispensed using the bin 100 in order to prevent jamming of the tablets between the walls 136 and 134. According to some embodiments, the third divider wall 136 forms an angle B of at least about 30 degrees with respect to horizontal.

The fourth divider wall 138 is disposed in the hopper chamber 111 above the walls 132, 134, 136. The wall 138 is generally inverted V- or U-shaped and has legs 138A and 138B. According to some embodiments, each leg 138A, 138B forms an angle of at least about 30 degrees with respect to horizontal and, according to some embodiments, at least 45 degrees. According to some embodiments, the legs 138A, 138B form an angle of about 90 degrees with respect to one another.

The first divider wall 132, the second divider wall 134, and the third divider wall 136 divide the hopper chamber 111 into subchambers or regions. More particularly and referring to FIGS. 5-7, a front region or subchamber 111A is defined between the first divider wall 132 and the inlet 122, a first rear region or subchamber 111B is defined between the first divider wall 132 and the second divider wall 134, a second rear region or subchamber 111C is defined between the second divider wall 134 and the third divider wall 136, and a third rear region or subchamber 111D is defined between the third divider wall 136 and the rear, front and top walls of the bin 100.

With reference to FIG. 8, the housing 110 further includes a high pressure supply port or nozzle 107. In use, the pressurized gas source 105 is fluidly connected to the high pressure nozzle 107 via a manifold, fitting, flexible or rigid conduit 107A, or the like. The gas source 105 may include a compressor or a container of compressed gas, for example. The high pressure gas source 105 is operative to provide a supply gas flow of a suitable working gas at a high pressure to the nozzle 107. According to some embodiments, the supplied gas is or includes air. According to some embodiments, the pressure of the supplied gas at the nozzle 107 is at least about 10 psi and, according to some embodiments, between about 10 and 60 psi.

A gas supply passage or conduit fluidly connects the high pressure nozzle 107 to a forward control valve 142 (FIG. 8). Two forward jet supply passages fluidly connect the forward control valve 142 to respective forward drive jet apertures or outlets 146. The forward jet outlets 146 are positioned and configured to direct air or other supplied gas into the dispensing channel 120. A front agitation supply passage fluidly connects the forward control valve 142 to a front air amplifier 160. The front air amplifier 160 is positioned and configured to direct air or other supplied gas into the hopper chamber 111 through the front agitation outlet 152. The forward control valve 142 is operable to control airflow to the forward jet outlets 146 and the front air amplifier 160.

Figure 9:
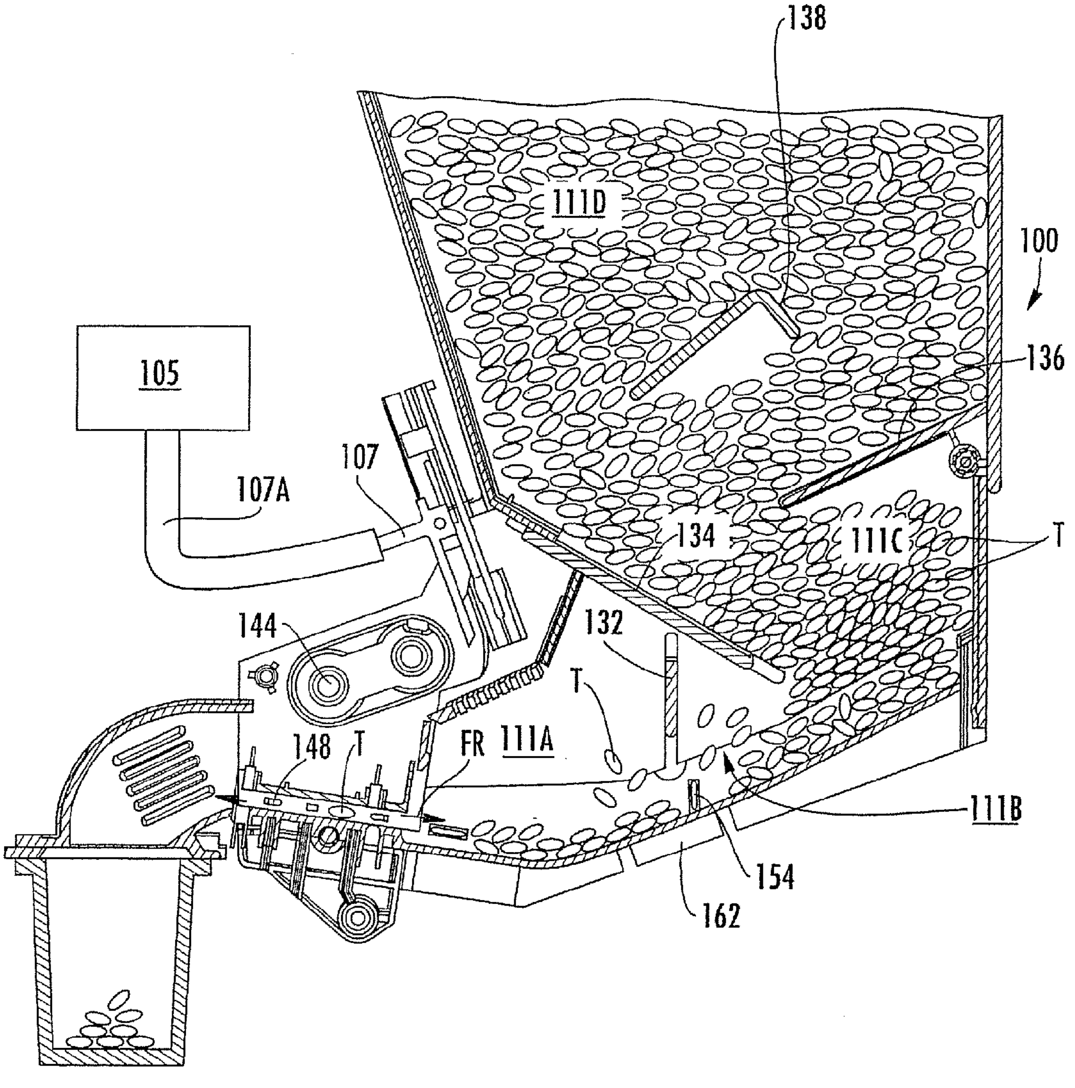
FIG. 9 is a cross-sectional view of the bin of FIG. 3 wherein a tablet is being returned to a hopper of the bin in a reverse direction.

A further gas supply passage or conduit fluidly connects the high pressure nozzle 107 to a reverse control valve 144 (FIG. 9). A reverse jet supply passage fluidly connects the reverse control valve 144 to a reverse drive jet aperture or outlet 148. The reverse jet outlet 148 is positioned and configured to direct air or other supplied gas into the dispensing channel 120. A rear agitation supply passage fluidly connects the reverse control valve 144 to a rear air amplifier 162. The rear air amplifier 162 is positioned and configured to direct air or other supplied gas into the hopper chamber 111 through the rear agitation outlet 154. The reverse control valve 144 is operable to control airflow to the reverse jet outlet 148 and the rear air amplifier 162.

In use, the air amplifiers 160, 162 can be used to convert a supplied pressurized gas flow having a given pressure, velocity and mass flow rate into an exiting or output air flow having a comparatively lower pressure, higher velocity, and higher mass flow rate. The outlets of the air amplifiers 160, 162 are positioned in or adjacent the agitation outlets 152, 154, respectively, so that the exit gas flow enters the hopper chamber 111 through the agitation outlets 152, 154. The air amplifiers 160, 162 may be constructed and/or operate in the manner disclosed in U.S. patent application Ser. No. 11/750,710, the disclosure of which is incorporated herein by reference. Each of the air amplifiers 160, 162 may be secured to the housing 110.

According to some embodiments and as illustrated, the drive jet outlets 146, 148 and the agitation outlets 152, 154 are fluidly connected to the pressurized gas source 105 via the same intake (i.e., the nozzle 107). According to some embodiments, a single gas source is used to supply all drive jet outlets and agitation outlets. According to some embodiments, the pressure of the gas supplied to each air amplifier 160, 162 is substantially the same as the pressure of the gas supplied to each drive jet outlet 146, 148.

Alternative mechanisms may be used to provide the agitation gas flows discussed herein. For example, the system 40 may provide agitation flow using a separate low pressure manifold as disclosed in U.S. Patent Publication No. US-2006-0241807-A1.

With reference to FIGS. 5 and 6, the bin 100 further includes an adjustable dispensing channel subassembly 170. The subassembly 170 includes a ceiling wall 172, a floor wall 174, a left side wall 176 (FIG. 5), a right side wall (not visible in the drawings) opposite the left side wall 176, a dispensing channel height adjustment mechanism 180, and a dispensing channel width adjustment mechanism 182. The left side wall 176 may be fixed with respect to and may be secured to or integrally formed with the housing 110 and the jets 146, 148 can be formed in the fixed left side wall 176.

The ceiling wall 172, the floor wall 174, and the right side wall together define the dispensing channel 120, the inlet 122, and the outlet 124. The heightwise dimension and widthwise dimension of the dispensing channel 120, the inlet 122, and the outlet 124 can be selectively configured using the adjustment mechanisms 180, 182. As illustrated, the adjustment mechanisms 180, 182 may each comprise a thumbscrew adjuster 180A, 182A. However, other types of adjustment mechanisms may be used.

With reference to FIG. 6, a sensor system may be provided including an exit photoemitter 80, an exit photosensor or photodetector 82, an entrance photoemitter 84, an entrance photosensor or photodetector 86, the controller 42, and an emitter driver operative to monitor flow of tablets T through the dispensing channel 120. The photoemitter 80 and the photosensor 82 may cooperate as a first sensor pair and the photoemitter 84 and the photosensor 86 may cooperate as a second sensor pair. Additionally, the first and second sensor pairs may be cooperatively used or monitored as disclosed in U.S. patent application Ser. No. 11/834,936, the disclosure of which is incorporated herein by reference.

Exemplary operation of the dispensing system 40 will now be described. The bin 100 is filled with tablets T to be dispensed. More particularly, the door 116A may be opened and the tablets T may be poured into the hopper chamber 111 through the opening 116. The tablets will fall or settle to the bottom of the hopper chamber 111 and progressively fill the hopper chamber 111. The tablets will tend to collect rearward of the divider walls 132, 134 as illustrated in FIG. 7.

Once the bin 100 is desirably filled with tablets, the tablets T may initially be at rest. At this time, the valves 142, 144 are closed so that no gas flow is provided through the jet outlets 146, 148 or the agitation outlets 152, 154.

If necessary, the adjustable dispensing channel subassembly 170 is suitably adjusted using the adjusters 180, 182 to provide the dispensing channel 120 and/or the inlet 122 with the appropriate dimensions for singulating the intended tablets T.

When it is desired to dispense the tablets T to fill the container C, the dispensing carrier 70, directed by the controller 42, moves the container C to the exit port of the nozzle 114 of the selected dispensing bin 100. The controller 42 signals the forward valve 142 to open (while the reverse valve 144 remains closed). The opened valve 142 permits the pressurized gas from the gas source 105 to flow through the gas supply passages and out through the forward drive jet outlets 146. The pressurized flow from the jet outlets 146 creates high velocity gas jets that generate suction that causes a forward flow FF of high pressure, high velocity air to be drawn outwardly through the dispensing channel 120 (FIG. 8). Tablets T are oriented into a preferred orientation by the shape of the inlet 122 to the dispensing channel 120 and dispensed into the container C through the dispensing channel 120 and the outlet 124 under the force of the forward flow FF. The photodetectors 82, 86 detect the tablets T as they pass through respective predetermined points in the dispensing channel 120.

The opening of the valve 142 also simultaneously permits the pressurized supply gas from the gas source 105 to flow through the front air amplifier 160 and out through the front agitation outlet 152 as an agitation air flow having a relatively low velocity and high mass flow rate as compared to the gas flow from the jet outlets 146. The front agitation air flow flows through and lofts or otherwise displaces (i.e., agitates) the tablets T in the front subchamber 111A proximate the inlet 122. This agitation of the tablets T helps to orient the tablets T for singulated entry into the dispensing channel 120 and to prevent tablet jams. According to some embodiments, the forward jet gas flows and the front agitation flow are provided simultaneously.

Once dispensing is complete (i.e., a predetermined number of tablets has been dispensed and counted), the controller 42 activates the forward valve 142 to close and the reverse valve 144 to open. The opened valve 144 permits the pressurized gas from the gas source 105 to flow out through the reverse drive jet outlet 148. The pressurized flow from the jet outlet 148 creates a high velocity gas jet that generates suction that causes a reverse (i.e., rearward) flow FR of high pressure air to be drawn inwardly through the dispensing channel 120 toward the chamber 111. In this manner, the airflow is reversed and any tablets T remaining in the channel 120 are returned to the chamber 111 under the force of the reverse flow (FIG. 9).

The opening of the valve 144 also simultaneously permits the pressurized supply gas from the gas source 105 to flow through the rear air amplifier 160 and out through the rear agitation outlet 154 as a rear agitation air flow which has a relatively low velocity and high mass flow rate as compared to the gas flow from the jet outlet 148. The rear agitation air flow flows through and lofts or otherwise displaces (i.e., agitates) the tablets T in the front subchamber 111A and/or the intermediate subchamber 111B proximate the choke point between the first divider wall 132 and the floor 150. This agitation of the tablets T helps to loosen the tablets T to permit return of the tablets T and to prevent or break tablet jams. According to some embodiments, the reverse jet gas flow and the rear agitation flow are provided simultaneously. According to some embodiments, the reverse valve 144 is opened and then closed after a relatively short period to provide the reverse flow FR and the rear agitation flow as short bursts.

During a dispensing cycle (i.e., when the forward flow FF is being generated), the controller 42 may determine that a tablet jam condition is or may be present. A tablet jam is a condition wherein one or more tablets are caught up in the bin 100 such that tablets T will not feed into or through the dispensing channel 120 under the pass of the forward flow FF. Tablets may form a jam at the nozzle inlet 122, one of the choke points 132A, 134A or elsewhere so that no tablets are sensed passing through the dispensing passage 120 for a prescribed period of time while the forward air flow FF is being generated. When a tablet jam is identified by the controller 42, the controller 42 will issue a "jam clear" or "backjet" by closing the forward valve 142 and opening the reverse valve 144 as described above for generating the air flow FR and the rear agitation flow to clear a perceived tablet jam. These air flows may serve to dislodge any such jams as well as to loosen the tablets in the subchamber 111C.

According to some embodiments and as illustrated, the drive jet outlet 146 and the agitation outlet 152 (and/or the drive jet outlet 148 and the agitation outlet 154) are fluidly connected to the pressurized gas source 105 via the same intake (i.e., the nozzle 107). According to some embodiments and as illustrated, only a single gas source 105 is used to supply both the drive jet outlets 146 and the agitation outlet 152 or both the drive jet outlet 148 and the agitation outlet 154. According to some embodiments, a single gas source is used to supply all drive jet outlets and agitation outlets.

The article supply regulation system 130 (including the divider walls 132, 134, 136, 138 and the choke points 132A, 134A, 136A) facilitates smooth and reliable operation of the bin 100, while also allowing for filling the bin 100 with a greater number of tablets. With reference to FIG. 7, the divider walls 132, 134 and the choke points 132A, 134A limit or reduce the weight load that tends to push the tablets forward into the front or staging region 111A. However, in the absence of the divider wall 136 and/or the divider wall 138, the divider walls 132, 134 may be overloaded by the tablets stacked in the hopper subchambers 111C, 111D. Such overloading may force too many tablets through one or both of the choke points 132A, 134A and/or may cause the tablets to jam at one or both of the choke points 132A, 134A. The divider walls 136, 138 are positioned above the active dispensing region and have upper support surfaces disposed at an angle with respect to vertical. The divider walls 132, 134 serve to relieve or offload the weight of the tablets in the hopper subchamber 111D from the downstream feed or flow path of the tablets.

The article supply regulation system 130 thereby operates as a stepdown load reducer, with each divider wall 132, 134, 136, 138 serving a particular function in controlling the loading and flow characteristics of the tablets. Because the divider walls 136, 138 typically cannot be overloaded, the article supply regulation system 130 may be infinitely scalable thereby allowing for essentially unlimited hopper capacity. The article supply regulation system 130 may serve to passively regulate the supply of tablets to the region 111A and the active dispensing mechanism. According to some embodiments and as illustrated, no parts of the article supply regulation system 130 are moved during dispensing operation of the bin 100. As a result of the operation of the article supply regulation system 130 as discussed above, fewer tablets T tend to collect in the region 111A so that fewer tablets T must be displaced by the air flow from the air amplifier 150. Thus, by reducing the tablet load, the bin 100 may be able to effectively agitate the tablets and prevent jams with lower air flow energy from the air amplifier 150. The sizes of the choke points 132A and 134A may be selectively adjusted by raising and lowering the divider walls 132 and 134 to customize the bin 100 for dispensing tablets of different sizes, for example.

According to some embodiments and as shown, the divider walls 138 and 136 each create voids or pockets 137 and 139 thereunder wherein tablets T do not accumulate. In this manner, the tablet loading is distributed to provide further improved tablet flow.

The angled orientations of the divider walls 132, 134 with respect to vertical also serves to reduce the forward loading on the tablets T. The angled divider walls 132, 134 may thereby permit a larger amount of tablets to be stored in the hopper chamber 111.

The arrangement of the divider walls 132, 134, 136, 138 may also serve to promote dispensing of the oldest tablets (i.e., the tablets that have been in the hopper chamber 120 longest) first. Generally, newer tablets are added on top of older tablets in the subchamber 111D or 111C. Once the bottommost tablets pass through the choke point 134A, they tend not to return to the subchamber 111C even when a backjet is executed.

While four divider walls 132, 134, 136, 138 are described and illustrated in the bin 100, article supply regulation systems in accordance with the present invention may be incorporated using as few as three divider walls. For example, according to further embodiments, the divider wall 138 may be omitted; however, it may be desirable to also alter the configuration of the divider wall 136 (e.g., by extending its forward length). Additionally, more than four divider walls may be provided. Additional divider walls may be positioned above the divider walls 132, 134, 136, 138 to break the fall of (i.e, absorb the impact or energy from) the tablets T. The additional divider walls may also serve to create additional voids and gates to control the flow of additional tablets and keep the load of additional tablets from impacting the flow. As the bin is made to have additional capacity, then additional divider walls may assist in load distribution as the additional tablets are added. The gaps defined by the additional walls should be large enough so that the intended tablets can pass therethrough without jamming.

The divider wall 134 may alternatively be fixed so that the gap spacing G2 is fixed rather than adjustable. In this case, the gap spacing G2 is sized to be at least as large as the greatest dimension of the largest tablet intended to be dispensed using the bin 100.

While the bin 100 has been illustrated and described herein with only one front air amplifier 150 and one rear air amplifier 160, fewer or greater numbers of front and rear air amplifiers may be provided. For example, there may be two or more front air amplifiers 150 and/or two or more rear air amplifiers 160. According to some embodiments, the bin may include only one or more front air amplifiers 150 or, alternatively, only one or more rear air amplifiers 160. The air amplifiers may be arranged and configured in any suitable manner. For example, a row or rows of air amplifiers may extend across the width of the floor 122.

While the bin 100 has been illustrated and described herein with the air amplifier 150 being supplied from the same valve 142 and controlled in group fashion with the drive jet outlets 146 and the air amplifier 160 being supplied from the same valve 144 and controlled in group fashion with the drive jet outlet 148, one or both of the air amplifiers 150, 160 can be separately controlled from the associated jet outlets. For example, a further valve may be provided that controls the gas supply to the air amplifier 150 independently of the jet outlets 146, whereby the tablets T may be agitated via the air amplifier 150 prior to providing the dispensing draw via the jet outlets.

While embodiments employing gas flow drive mechanisms are described herein, other embodiments of the present invention may employ other drive mechanisms in place of or in addition to gas flow. For example, the articles (e.g. pharmaceutical tablets) may be passed in the forward and/or reverse direction by vibration and/or gravity.

The foregoing is illustrative of the present invention and is not to be construed as limiting thereof. Although a few exemplary embodiments of this invention have been described, those skilled in the art will readily appreciate that many modification are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An apparatus for dispensing solid articles, the apparatus comprising:

a dispensing channel having an inlet and an outlet and defining a dispensing path therebetween;

a housing defining a hopper chamber to hold the articles, wherein the hopper chamber is in fluid communication with the inlet of the dispensing channel, the housing including a floor; and an article supply regulation system including a first divider wall, a second divider wall, a third divider wall and a fourth divider wall configured and positioned in the hopper chamber to define, in combination with the housing:

a front region between the inlet and the first divider wall;

a first rear region between the first divider wall and the second divider wall;

a second rear region between the second divider wall and the third divider wall; and a third rear region on a side of the third divider wall opposite the second rear region;

wherein:

the first divider wall forms a front choke passage between the front region and the first rear region and between the first divider wall and the floor;

the second divider wall forms a first rear choke passage between the first rear region and the second rear region and between the second divider wall and the floor;

the third divider wall forms a second rear choke passage between the second rear region and the third rear region and between the third divider wall and the floor and/or a side wall of the housing;

the fourth divider wall is positioned in the hopper chamber above the second and third divider walls and is configured to direct articles onto the second and third divider walls; and the fourth divider wall includes first and second legs collectively arranged in an inverted V-shape or an inverted U-shape, the first leg being disposed at an angle with respect to horizontal to direct some of the articles onto the second divider wall and the second leg being disposed at an angle with respect to horizontal to direct some of the articles onto the third divider wall.

2. The apparatus of claim 1 wherein the second rear choke passage has a width that is greater than a smallest dimension of a prescribed article.

3. The apparatus of claim 1 wherein the third divider wall has an upper surface disposed at an included angle of at least about 30 degrees with respect to horizontal.

4. The apparatus of claim 1 wherein a spacing between the first divider wall and the floor is adjustable to adjust the size of the front choke passage.

5. The apparatus of claim 4 wherein a spacing between the second divider wall and the floor is adjustable to adjust the size of the first rear choke passage.

6. The apparatus of claim 1 wherein a spacing between the second divider wall and the floor is adjustable to adjust the size of the first rear choke passage.

7. The apparatus of claim 1 including an agitation outlet in the housing and a gas source fluidly connected to the agitation outlet, wherein the agitation outlet is positioned and configured to direct a gas flow from the gas source into at least one of the front region and the first rear region to agitate articles therein.

8. The apparatus of claim 1 wherein the apparatus includes a drive mechanism operable to pass the articles along the dispensing path and through the inlet.

9. The apparatus of claim 8 wherein the drive mechanism includes a flow generator configured to generate at least one drive gas flow to pass articles along the dispensing path and through the inlet.

10. The apparatus of claim 9 including:

a drive jet outlet;

an agitation outlet; and at least one gas source to provide a positive pressure supply gas flow to each of the drive jet outlet and the agitation outlet to provide:

a pressurized drive jet gas flow through the drive jet outlet to convey articles through the dispensing channel along the dispensing path; and a pressurized agitation gas flow through the agitation outlet to agitate articles in the hopper chamber.

11. The apparatus of claim 10 configured to generate the drive jet gas flow and the agitation gas flow simultaneously.

12. The apparatus of claim 10 further including a second agitation outlet, wherein:

the first agitation outlet is positioned and configured to direct the first agitation gas flow into the front region to agitate articles in the front region; and the second agitation outlet is positioned and configured to direct a second agitation gas flow into the first rear region to agitate articles in the first rear region.

13. The apparatus of claim 1 wherein each of the first and second legs is disposed at an included angle of at least about 30 degrees with respect to horizontal.

14. The apparatus of claim 1 wherein the second and third divider walls slope downwardly in opposite directions.

15. A method for dispensing solid articles, the method comprising:

providing an apparatus including:

a dispensing channel having an inlet and an outlet and defining a dispensing path therebetween;

a housing defining a hopper chamber to hold the articles, wherein the hopper chamber is in fluid communication with the inlet of the dispensing channel, the housing including a floor; and an article supply regulation system including a first divider wall, a second divider wall, a third divider wall and a fourth divider wall configured and positioned in the hopper chamber to define, in combination with the housing:

a front region between the inlet and the first divider wall;

a first rear region between the first divider wall and the second divider wall;

a second rear region between the second divider wall and the third divider wall; and a third rear region on a side of the third divider wall opposite the second rear region;

wherein:

the first divider wall forms a front choke passage between the front region and the first rear region and between the first divider wall and the floor;

the second divider wall forms a first rear choke passage between the first rear region and the second rear region and between the second divider wall and the floor;

the third divider wall forms a second rear choke passage between the second rear region and the third rear region and between the third divider wall and the floor and/or a side wall of the housing;

the fourth divider wall is positioned in the hopper chamber above the second and third divider walls and is configured to direct articles onto the second and third divider walls; and the fourth divider wall includes first and second legs collectively arranged in an inverted V-shape or an inverted U-shape, the first leg being disposed at an angle with respect to horizontal to direct some of the articles onto the second divider wall and the second leg being disposed at an angle with respect to horizontal to direct some of the articles onto the third divider wall;

placing the articles in the apparatus such that the articles are disposed in each of the front region, the first rear region, the second rear region and the third rear region and a load of the articles in the third rear region is supported by the third divider wall; and dispensing the articles from the hopper chamber through the dispensing channel.

16. The method of claim 15 wherein the articles are pharmaceutical articles.

17. The method of claim 15 wherein each of the first and second legs is disposed at an included angle of at least about 30 degrees with respect to horizontal.

* * * * *